United States Patent
Lee et al.

(10) Patent No.: US 9,325,984 B2
(45) Date of Patent: Apr. 26, 2016

(54) THREE-DIMENSIONAL IMAGE DISPLAY DEVICE AND DRIVING METHOD THEREOF

(75) Inventors: Jae-Ho Lee, Cheonan-si (KR);
Sun-Hyung Kim, Seoul (KR);
Bong-Jun Lee, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 905 days.

(21) Appl. No.: 13/007,320

(22) Filed: Jan. 14, 2011

(65) Prior Publication Data

US 2011/0193891 A1  Aug. 11, 2011

(30) Foreign Application Priority Data

Feb. 9, 2010 (KR) .................. 10-2010-0011930
Sep. 27, 2010 (KR) .................. 10-2010-0093162

(51) Int. Cl.
*G09G 5/10* (2006.01)
*H04N 13/04* (2006.01)
*G09G 3/00* (2006.01)
*G09G 3/36* (2006.01)

(52) U.S. Cl.
CPC .......... *H04N 13/0497* (2013.01); *G09G 3/003* (2013.01); *G09G 3/3677* (2013.01); *H04N 13/0438* (2013.01); *G09G 2310/0205* (2013.01); *G09G 2310/0286* (2013.01); *G09G 2310/061* (2013.01); *G09G 2320/0209* (2013.01); *G09G 2320/0257* (2013.01)

(58) Field of Classification Search
CPC  G09G 3/003; H04N 13/0438; H04N 13/0497
USPC .............................. 345/87, 89, 418, 419, 690
See application file for complete search history.

(56) References Cited

U.S. PATENT DOCUMENTS

| | | | |
|---|---|---|---|
| 6,084,632 A | 7/2000 | Inuiya et al. | |
| 6,448,952 B1 * | 9/2002 | Toyoda et al. | 345/97 |
| 6,693,618 B2 | 2/2004 | Son et al. | |
| 6,967,759 B2 * | 11/2005 | Hewlett et al. | 359/242 |
| 7,265,741 B2 | 9/2007 | Kumamoto et al. | |
| 7,417,664 B2 * | 8/2008 | Tomita | 348/43 |
| 7,489,319 B2 * | 2/2009 | Tomita | 345/589 |
| 7,561,149 B2 | 7/2009 | Kwon | |
| 7,911,541 B2 * | 3/2011 | Yamamoto et al. | 348/655 |
| 8,766,890 B2 * | 7/2014 | Robinson et al. | 345/87 |
| 2001/0052887 A1 * | 12/2001 | Tsutsui et al. | 345/87 |

(Continued)

FOREIGN PATENT DOCUMENTS

| | | |
|---|---|---|
| CN | 101295481 | 10/2008 |
| CN | 101551984 | 10/2009 |

(Continued)

OTHER PUBLICATIONS

English Abstract for Publication No. 2001-025032.

(Continued)

*Primary Examiner* — Calvin C Ma
(74) *Attorney, Agent, or Firm* — F. Chau & Associates, LLC

(57) ABSTRACT

A three dimensional image display device includes a display panel and shutter glasses. White image data is displayed during a white image data input period which is disposed before an input period of left eye image data or an input period of right eye image data. As a result, the luminance of a three dimensional image display device may be increased.

20 Claims, 11 Drawing Sheets

(56) References Cited

U.S. PATENT DOCUMENTS

| | | | |
|---|---|---|---|
| 2005/0218975 A1* | 10/2005 | Chang et al. | 330/9 |
| 2006/0215262 A1 | 9/2006 | Kim | |
| 2007/0035493 A1 | 2/2007 | Chang | |
| 2007/0064162 A1 | 3/2007 | Yamamoto et al. | |
| 2007/0222703 A1 | 9/2007 | Sugihara et al. | |
| 2008/0238854 A1 | 10/2008 | Kimura | |
| 2008/0284801 A1 | 11/2008 | Brigham et al. | |
| 2008/0303963 A1 | 12/2008 | Jung et al. | |
| 2009/0033741 A1 | 2/2009 | Oh et al. | |
| 2010/0118045 A1* | 5/2010 | Brown Elliott et al. | 345/589 |
| 2010/0201790 A1* | 8/2010 | Son et al. | 348/53 |

FOREIGN PATENT DOCUMENTS

| | | |
|---|---|---|
| JP | 2001-025032 | 1/2001 |
| JP | 2001-028032 | 1/2001 |
| JP | 2004-310113 | 11/2004 |
| JP | 2004-320081 | 11/2004 |
| JP | 2005-130350 | 5/2005 |
| JP | 2008-058939 | 3/2008 |
| JP | 2008-083457 | 4/2008 |
| JP | 2008-130139 | 6/2008 |
| JP | 2009-031797 | 2/2009 |
| JP | 2009-042446 | 2/2009 |
| JP | 2009-232249 | 10/2009 |
| KR | 1020010004882 | 1/2001 |
| KR | 1020060001680 | 1/2006 |
| KR | 10-20060087711 | 8/2006 |
| KR | 1020060087711 | 8/2006 |
| KR | 1020060109096 | 10/2006 |
| KR | 1020070043147 | 4/2007 |
| KR | 1020070050659 | 5/2007 |
| KR | 100861270 | 9/2008 |
| KR | 1020080090001 | 10/2008 |
| KR | 1020080104758 | 12/2008 |
| KR | 1020090072784 | 7/2009 |
| KR | 1020090072872 | 7/2009 |
| WO | WO 2008/100826 | 8/2008 |

OTHER PUBLICATIONS

Extended European Search Report Dated Dec. 18, 2012.
English Abstract for Publication No. 10-20060087711.
English Abstract for Publication No. 1020010004882.
English Abstract for Publication No. 2001-028032.
English Abstract for Publication No. 2004-310113.
English Abstract for Publication No. 2004-320081.
English Abstract for Publication No. 2005-130350.
English Abstract for Publication No. 1020060001680.
English Abstract for Publication No. 1020070050659.
English Abstract for Publication No. 2008-083457.
English Abstract for Publication No. 100861270.
English Abstract for Publication No. 1020080104758.
English Abstract for Publication No. 2009-031797.
English Abstract for Publication No. 1020090072872.
English Abstract for Publication No. 1020090072784.
English Abstract for Publication No. 1020070043147.
English Abstract for Publication No. 1020060109096.
English Abstract for Publication No. 1020080090001.

* cited by examiner

THREE-DIMENSIONAL IMAGE DISPLAY DEVICE AND DRIVING METHOD THEREOF

CROSS-REFERENCE TO RELATED APPLICATION

This application claims priority to and the benefit of Korean Patent Application No. 10-2010-0011930 filed in the Korean Intellectual Property Office on Feb. 9, 2010 and Korean Patent Application No. 10-2010-0093162 filed in the Korean Intellectual Property Office on Sep. 27, 2010, the entire contents of which are incorporated herein by reference.

BACKGROUND OF THE INVENTION (a) Technical Field

The present invention relates to an image display device, and more particularly, to a three dimensional image display device and a driving method thereof.

(b) Discussion of the Related Art

Generally, a three-dimensional (3D) image display device displays three dimensional perception of objects by using binocular parallax, which is the primary factor in recognizing a 3D feeling at a short distance. In binocular parallax, different two-dimensional (2D) images are projected onto a left eye and a right eye. When the images projected onto a left eye (hereinafter, "left eye image") and the images projected onto a right eye (hereinafter, "right eye image") are transferred to a brain of a viewer, the left eye image and the right eye image are mixed in the brain and thus are perceived as a 3D image having depth.

Some 3D image display devices relying upon binocular parallax may use a stereoscopic method in which glasses such as shutter glasses, polarized glasses, etc., are used. Other 3D display devices relying upon binocular parallax may use an autostereoscopic method without glasses where a lenticular lens, a parallax barrier, etc., are disposed on a display device.

When shutter glasses are used, the left eye image frames and the right eye image frames are alternately displayed in the 3D image display device using a technique known as alternate-frame sequencing. The 3D images are then perceived by the viewer by selectively opening and closing a left eye shutter and a right eye shutter of the shutter glasses so that image frames including the left eye image are only seen by the left eye while image frames including the right eye image are only seen by the right eye.

Display devices employing the shutter glasses method may thereby be capable of displaying 2D images in a 2D mode where every frame is intended for both left and right eyes and then may be switched to a 3D mode that is capable of displaying 3D images where alternating left eye and right eye image frames are displayed. In such a display, there may be no data loss in either mode. However, as the shutter glasses worn in the 3D mode rely on the closing of shutters for every other image frame, the luminance of the three dimensional image display device may be reduced as half of the image frames to not reach the eyes of the viewer. Moreover, as many shutter glasses utilize polarized lenses, additional luminance may be lost.

SUMMARY OF THE INVENTION

A three dimensional image display device according to an exemplary embodiment of the present invention includes a display device to which left-eye image data and right-eye image data are alternately input, wherein an input period of white image data is disposed before an input period of the left eye image data or an input period of the right eye image data.

The three dimensional image display device may further include a shutter member having a left eye shutter and a right eye shutter, and the input period of the white image data, the input period of the left eye image data, and the input period of the right eye image data may be disposed in a period in which the left eye shutter and the right eye shutter are closed.

The left eye shutter may be opened after a first time has passed from the completion of the input of the left eye image data, and the right eye shutter may be opened after the first time has passed from the completion of the input of the right eye image data.

The display device may further include a liquid crystal material, and the first time may be determined based on a response time of the liquid crystal material.

One of the left eye shutter and the right eye shutter may be opened and the other may be closed between the input period of the left eye image data and the input period of the right eye image data.

The display device may further include a plurality of gate lines and a plurality of data lines, at least a gate line of the plurality of gate lines receives a gate-on voltage for a first horizontal period, and the plurality of data lines receive the voltage corresponding to the white image data.

At least a gate line of the plurality of gate lines may receive a gate-off voltage for a second horizontal period.

One gate line of the plurality of gate lines may be applied with the gate-on voltage for the third horizontal period, and the plurality of data lines may be applied with the voltage corresponding to the left eye image data or the right eye image data.

The display device may further include a gate line and a gate driver, and the gate driver may be integrated on the substrate.

The gate driver may include a first scan start signal line and a first switching element connected to the first scan start signal line.

An input electrode and a control electrode of the first switching element may be connected to the first scan start signal line, and an output electrode of the first switching element may be connected to the gate line.

The gate driver may include a voltage signal line, a second scan start signal line, and a second switching element connected to the voltage signal line and the second scan start signal line.

An input electrode of the second switching element may be connected to the voltage signal line, a control electrode of the second switching element may be connected to the second scan start signal line, and an output electrode of the second switching element is connected to the gate line.

The gate driver may include a plurality of stages connected to one end of the gate line, each stage including a first input terminal, a second input terminal, an output terminal, and a transmitting signal output terminal, and the first input terminal of at least one of the plurality of stages may be connected to the transmitting signal output terminal of the other stage, while the output terminal is connected to the second input terminal of the other stage.

The stage may include an input section, a pull-up driver, a pull-down driver, an output unit, and a transmitting signal generator.

The input section, the pull-down driver, the output unit, and the transmitting signal generator may be connected to a first node.

A driving method of a three dimensional image display device including a display device according to other exemplary embodiment of the present invention includes alternately inputting left eye image data and right eye image data to the display device, and inputting white image data between an input of the left eye image data and an input of the right eye image data to the display device.

The three dimensional image display device may further include a shutter member having a left eye shutter and a right eye shutter, and the white image data, the left eye image data, and the right eye image data may be input when the left eye shutter and the right eye shutter are closed.

The method may further include opening the left eye shutter after a first time has passed from the completion of the input of the left eye image data, and opening the right eye shutter after the first time has passed from the completion of the input of the right eye image data.

The exemplary embodiment according to the present invention may provide increased luminance of a three dimensional image display device.

BRIEF DESCRIPTION OF THE DRAWINGS

The above and other features and aspects of the exemplary embodiments of the present invention will be described in detail with reference to the accompanying drawings, in which.

DETAILED DESCRIPTION OF EXEMPLARY EMBODIMENTS

Figure 1:
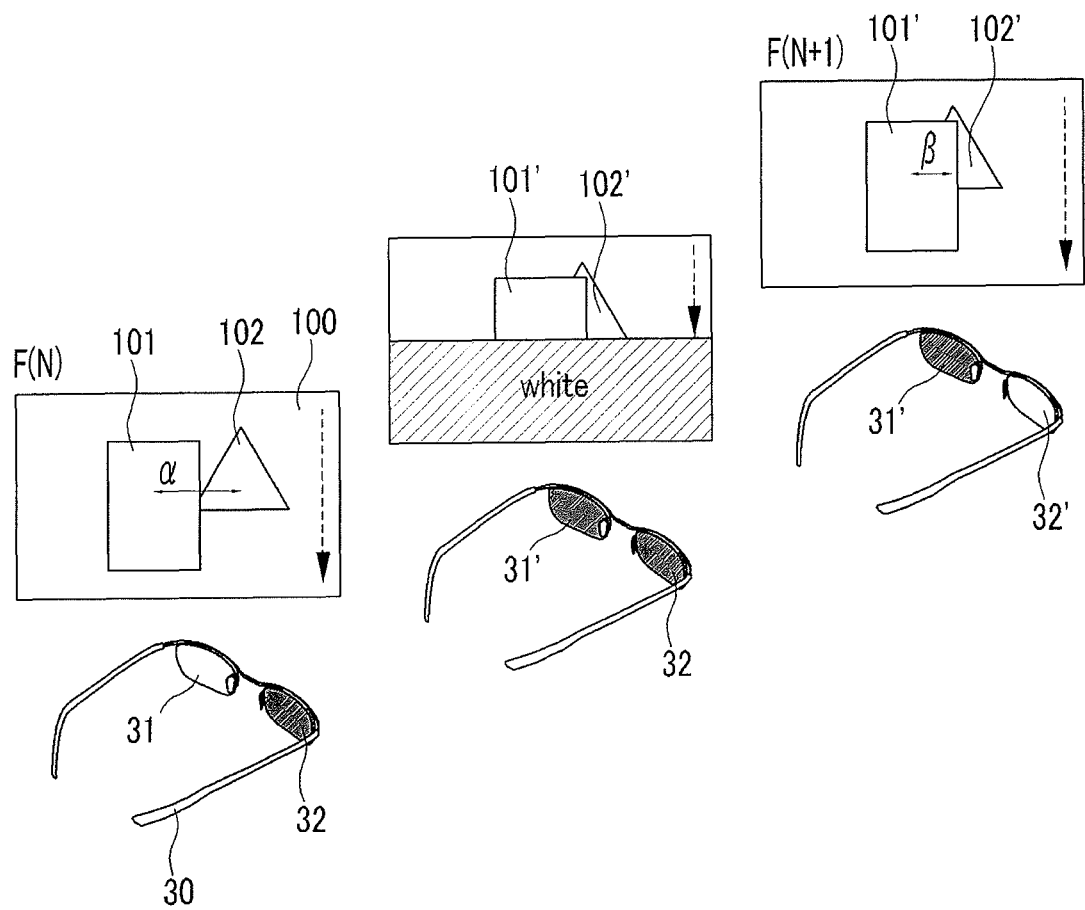
FIG. 1 is a schematic diagram showing an operation of a three dimensional image display device according to an exemplary embodiment of the present invention.

Exemplary embodiments of the present invention will be described more fully hereinafter with reference to the accompanying drawings. As those skilled in the art would realize, the described exemplary embodiments may be modified in various different ways, all without departing from the spirit or scope of the present invention. In the drawings, portions may be omitted to more clearly describe exemplary embodiments of the present invention, and like reference numerals may designate like elements throughout the specification.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present. A three dimensional image display device according to an exemplary embodiment of the present invention will be described below with reference to FIG. 1 to FIG. 8.

Figure 2:
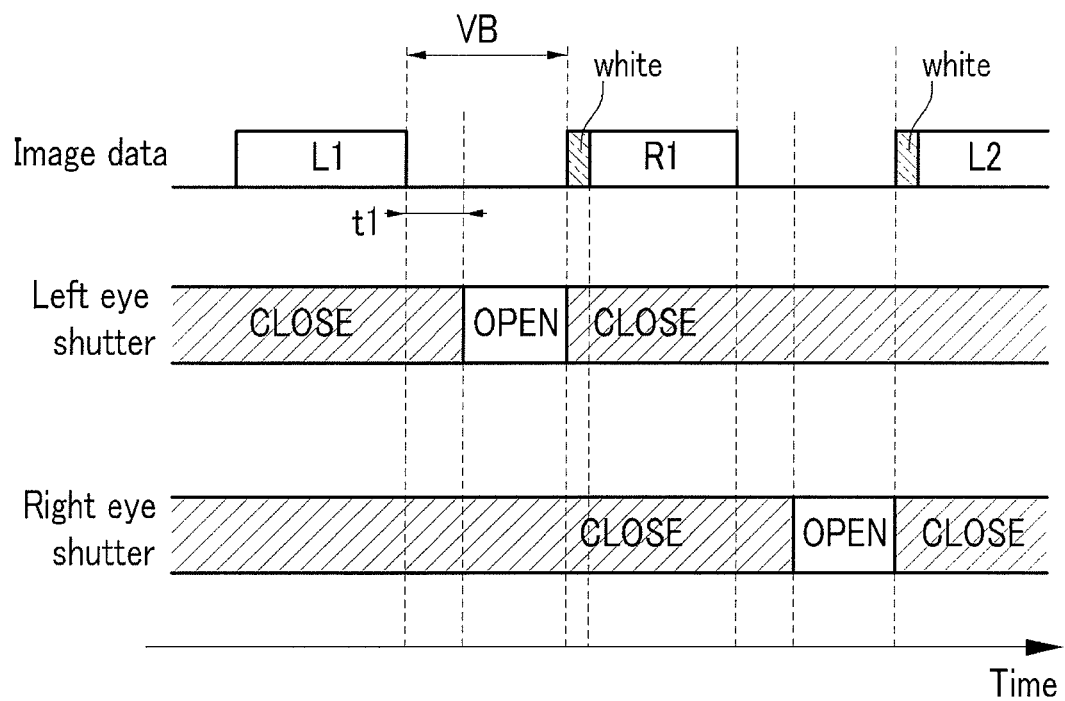
FIG. 2 is a graph showing a signal waveform of the three dimensional image display device of FIG. 1.
Figure 3:
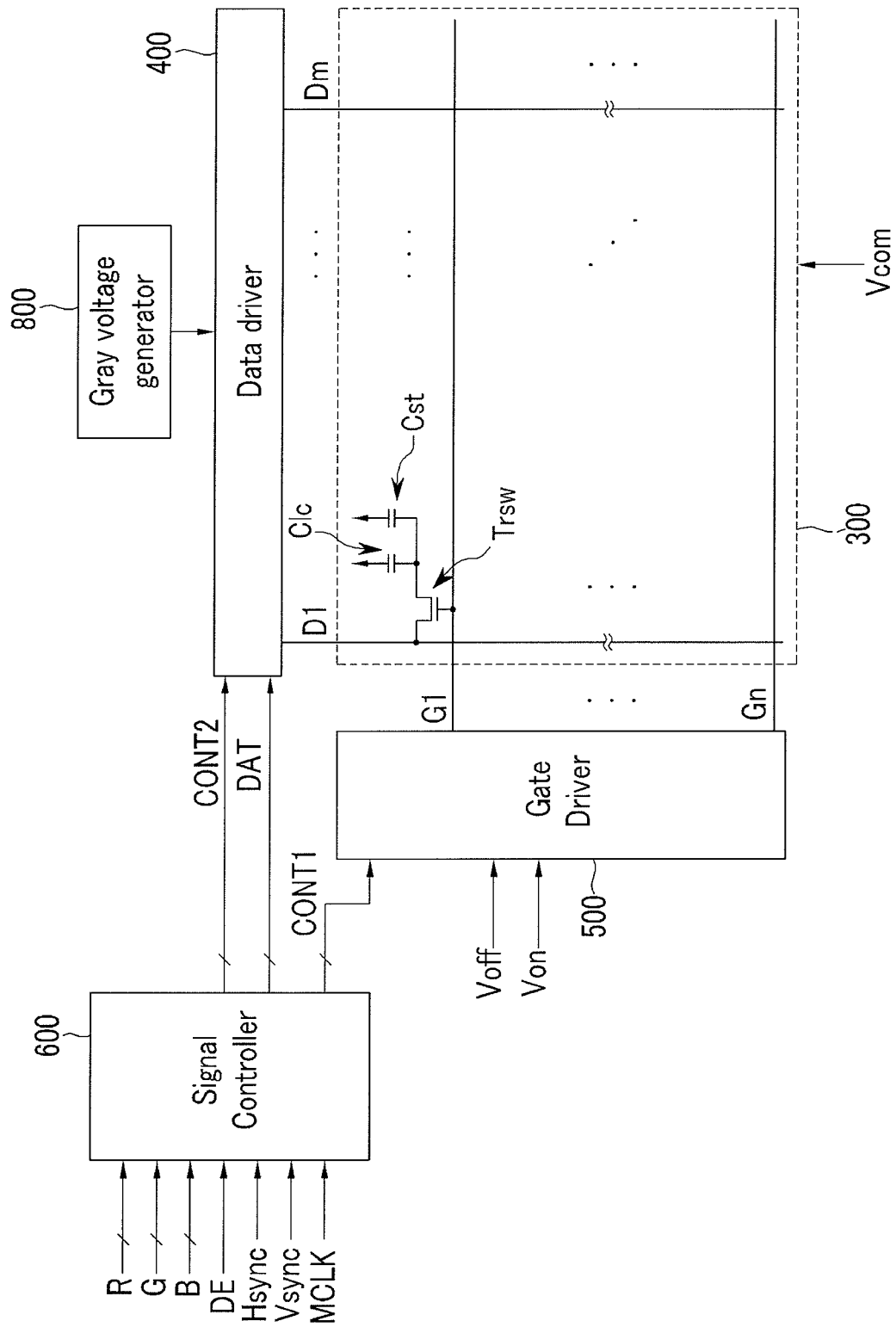
FIG. 3 is a block diagram of a three dimensional image display device according to an exemplary embodiment of the present invention.
Figure 4:
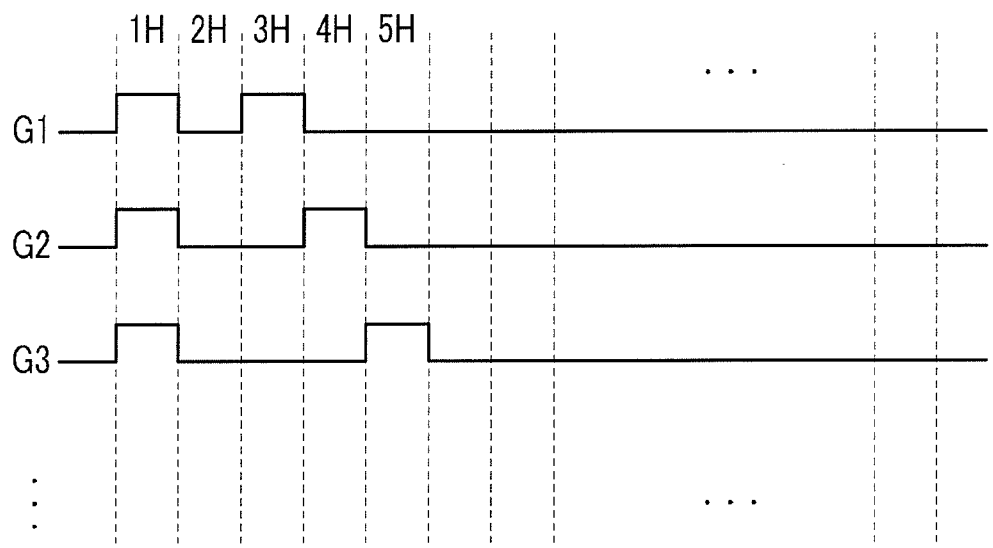
FIG. 4 is a graph showing a signal waveform of the three dimensional image display device of FIG. 3.
Figure 5:
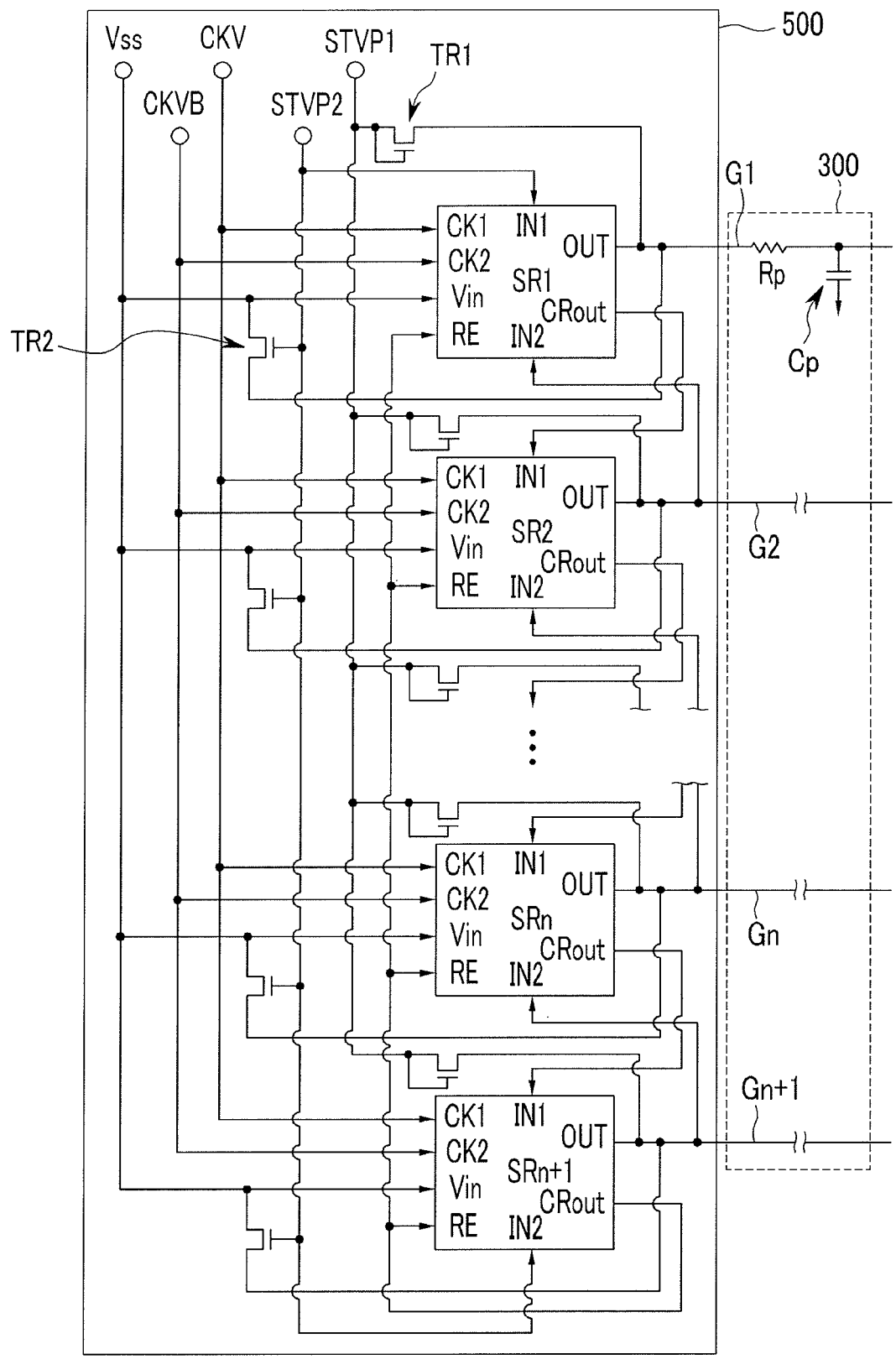
FIG. 5 is a block diagram of a gate driver according to an exemplary embodiment of the present invention.
Figure 6:
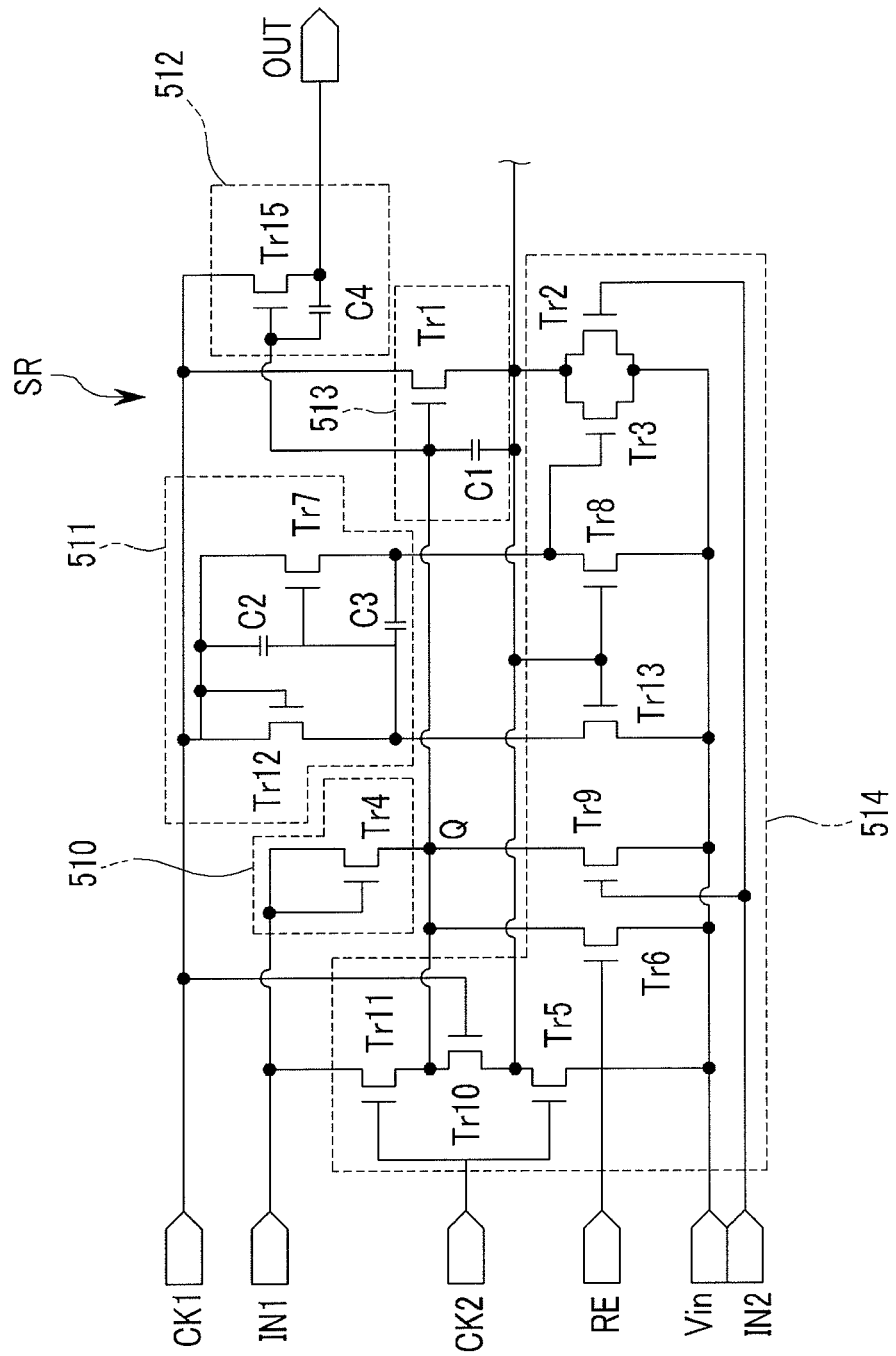
FIG. 6 is a circuit diagram showing a stage of the gate driver of FIG. 5.
Figure 7:
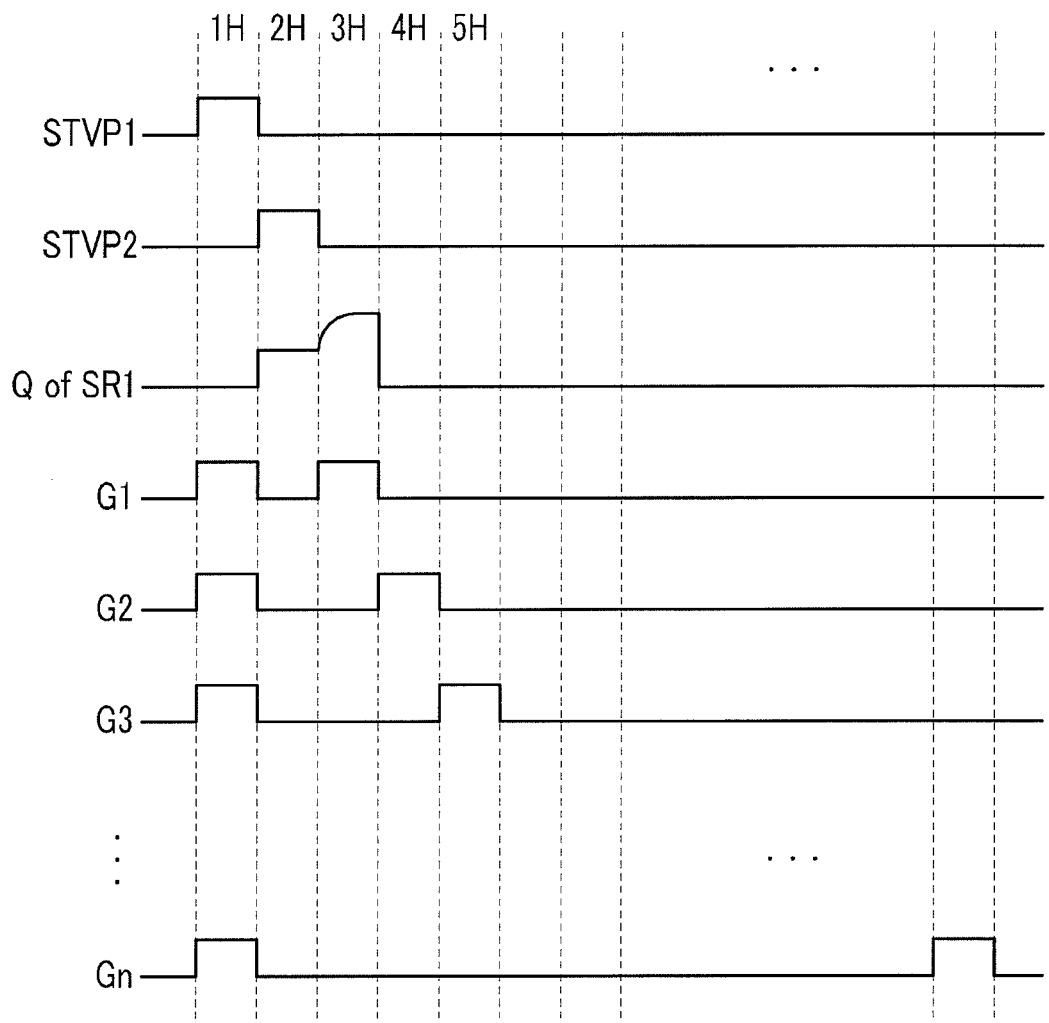
FIG. 7 is a graph showing a signal waveform of the gate driver of FIG. 5.
Figure 8:
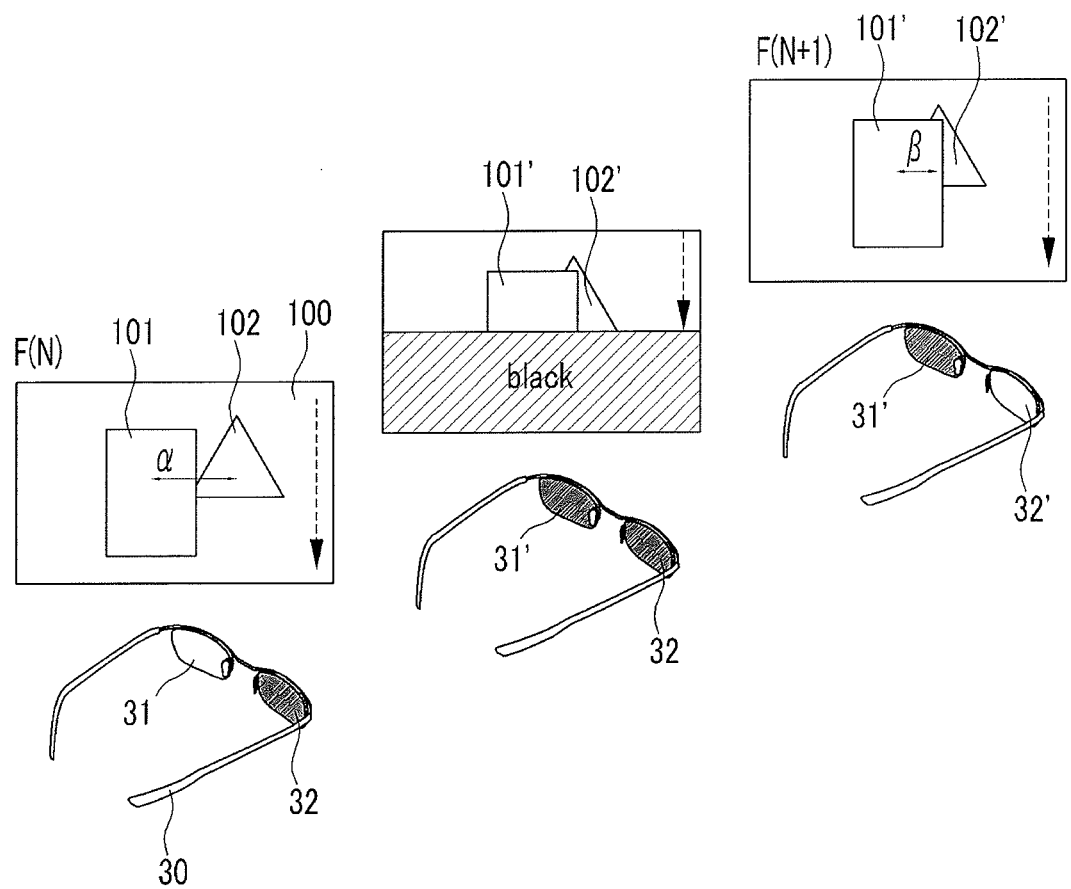
FIG. 8 is a schematic diagram showing an operation of a three dimensional image display device according to an exemplary embodiment of the present invention.
Figure 9:
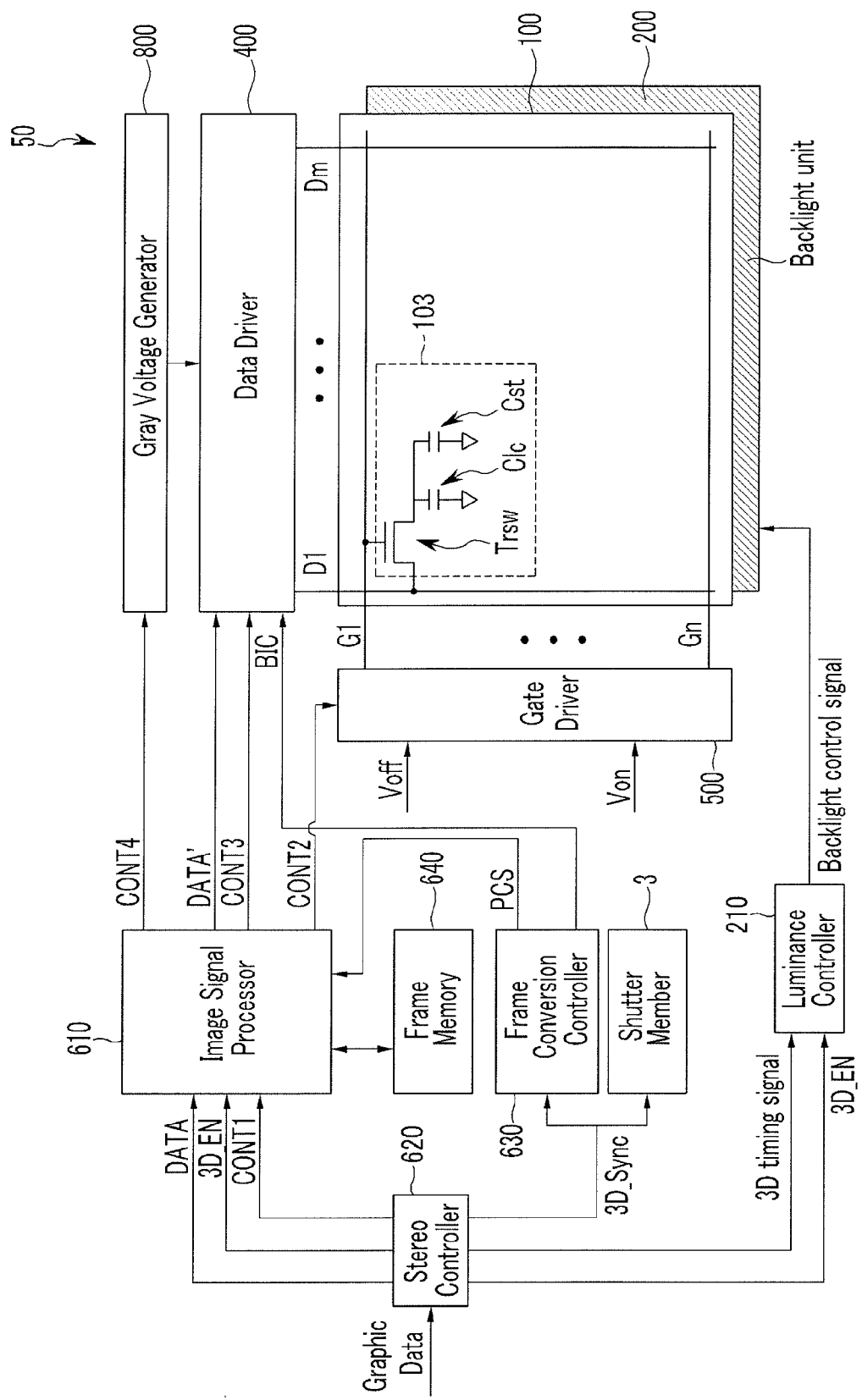
FIG. 9 is a view of a three dimensional image display device according to an exemplary embodiment of the present invention.
Figure 10:
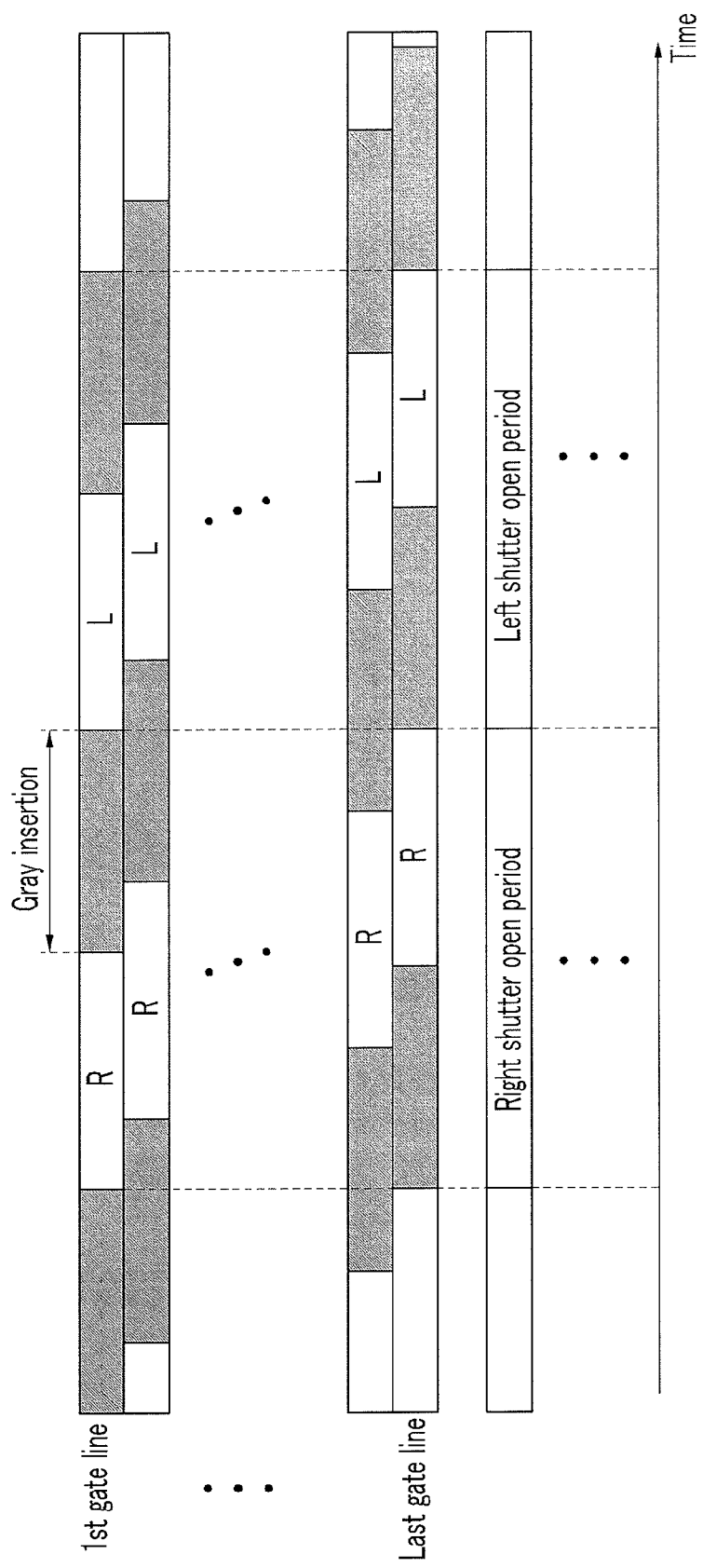
FIG. 10 is a graph showing a signal waveform of a three dimensional image display device according to an exemplary embodiment of the present invention.
Figure 11:
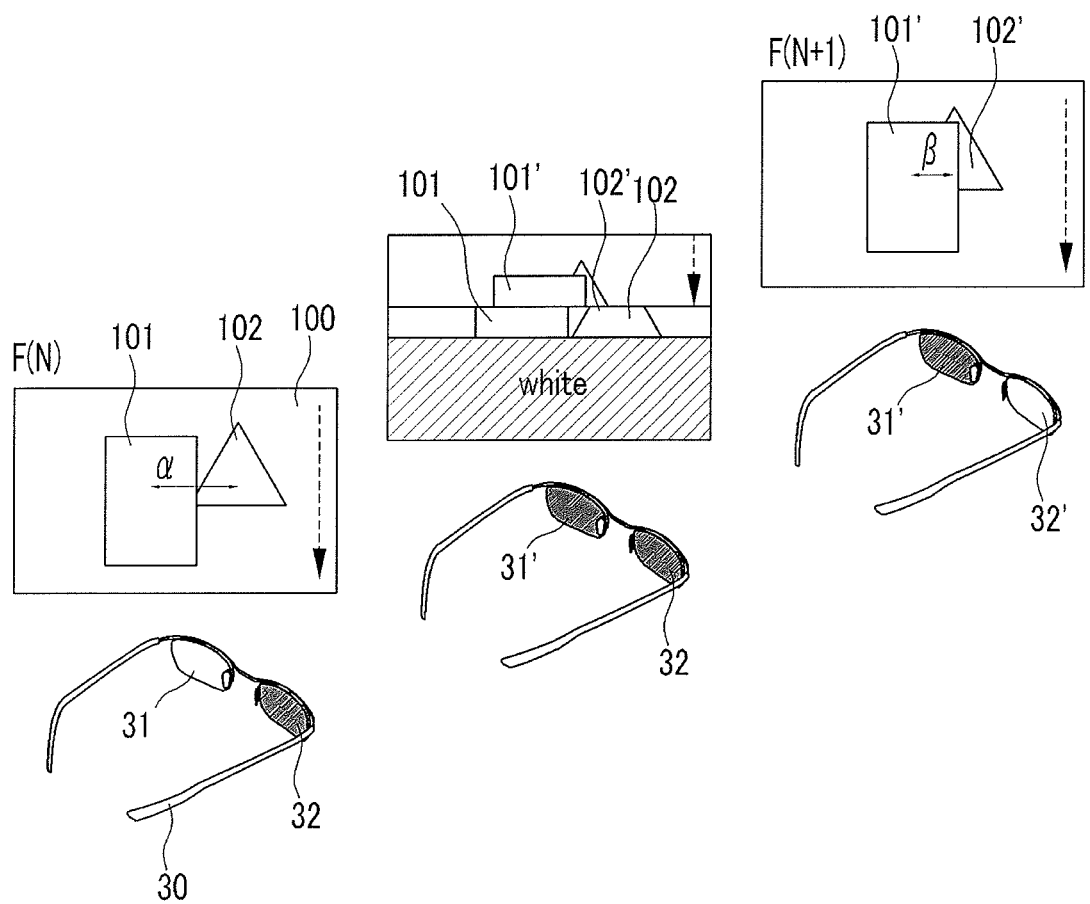
FIG. 11 is a schematic diagram showing an operation of a three dimensional image display device according to an exemplary embodiment of the present invention.

FIG. 1 is a schematic diagram showing an operation of a three dimensional image display device according to an exemplary embodiment of the present invention. FIG. 2 is a graph showing a signal waveform of the three dimensional image display device of FIG. 1. FIG. 3 is a block diagram of a three dimensional image display device according to an exemplary embodiment of the present invention. FIG. 4 is a graph showing a signal waveform of the three dimensional image display device of FIG. 3. FIG. 5 is a block diagram of a gate driver according to an exemplary embodiment of the present invention. FIG. 6 is a circuit diagram showing a stage of the gate driver of FIG. 5. FIG. 7 is a graph showing a signal waveform of the gate driver of FIG. 5. FIG. 8 is a schematic diagram showing an operation of a three dimensional image display device according to an exemplary embodiment of the present invention. FIG. 9 is a view of a three dimensional image display device according to an exemplary embodiment of the present invention. FIG. 10 is a graph showing a signal waveform of a three dimensional image display device according to an exemplary embodiment of the present invention. FIG. 11 is a schematic diagram showing an operation of a three dimensional image display device according to an exemplary embodiment of the present invention.

The display device 50 (FIG. 9) may be a liquid crystal display, an organic light emitting device, a plasma display device, or an electrophoretic display. Hereafter, a case in which the display device 50 is a liquid crystal display will be described with reference to FIG. 1 and FIG. 9.

The display device 50 may include a display panel 100 which includes an upper substrate, a lower substrate, and a liquid crystal layer interposed between the upper substrate and the lower substrate. The display panel 100 changes an alignment direction of a liquid crystal by an electric field generated between two electrodes, thereby displaying images by controlling transmittance of light.

Gate lines G1-Gn, data lines D1-Dm, a pixel electrode, and a thin film transistor Trsw connected thereto are disposed on a lower substrate of the display panel 100. The thin film transistor Trsw controls voltage applied to the pixel electrode based on signals applied to the gate lines G1-Gn and the data lines D1-Dm. The pixel electrode may be formed as a transflective pixel electrode that has a transmission region and a reflection region. In addition, a storage capacitor Cst may be further formed on the lower substrate, such that voltage applied to the pixel electrode is maintained for a predetermined time. For example, one pixel 103 may include the thin film transistor Trsw, the storage capacitor Cst, and a liquid crystal capacitor Clc.

A black matrix, a color filter, and a common electrode may be disposed on an upper substrate of the display panel 100 facing the lower substrate. In addition, at least one of the color filter, the black matrix, and the common electrode formed on the upper substrate may be formed on the lower substrate, and when both the common electrode and the pixel electrode are formed on the lower substrate, at least one of the two electrodes may be formed in a linear electrode form.

The liquid crystal layer may include a liquid crystal in a TN (twisted nematic) mode, a liquid crystal of a VA (vertically aligned) mode, a liquid crystal in an ECB (electrically controlled birefringence) mode, etc.

A polarizer is attached to the outside of the upper substrate and the outside of the lower substrate, respectively. Further, a compensation film may be added between the substrate and the polarizer.

A backlight unit 200 includes a light source such as, for example, a fluorescent lamp such as a CCFL (cold cathode fluorescent lamp), an LED, etc. In addition, the backlight unit 200 may further include a reflector, a light guide, a luminance improving film, etc.

Referring to FIG. 9, the display device 50 includes a display panel 100, a backlight unit 200, a data driver 400, a gate driver 500, an image signal processor 610, a stereo controller 620, a frame conversion controller 630, a frame memory 640, a luminance controller 210, and a gray voltage generator 800.

The stereo controller 620 may transmit a 3D timing signal and a 3D enable signal 3D_EN to the luminance controller 210. The luminance controller 210 may transmit a backlight control signal to the backlight unit 200. The backlight unit 200 may be turned on/off by the backlight control signal through the luminance controller 210 and the stereo controller 620. The backlight control signal transmitted to the backlight unit 200 can make the backlight unit 200 turn on for a predetermined time. For example, the backlight control signal transmitted to the backlight unit 200 can make the backlight unit 200 turn on for a vertical blank (VB) or a time other than the VB.

The stereo controller 620 may transmit a 3D sink signal 3D_sync to a shutter member 3. The shutter member 3 may be electrically connected to the stereo controller 620. The shutter member 3 can receive the 3D_sync signal 3D_sync by wireless infrared communication or wire communication. The shutter member 3 may be operated in response to the 3D sink signal 3D_sync or the modified 3D sink signal. The 3D sink signal 3D_sync may include all the signals that can open or close the left eye shutter or the right eye shutter. The stereo controller 620 can transmit display data DATA to the image signal processor 610.

The image signal processor 610 may transmit various display data DATA and DATA' and various control signals CONT1, CONT2, CONT3, CONT4, and 3D_EN to the display panel 100 through the gate driver 500, the data driver 400, and the gray voltage generator 800 to display the images to the display panel 100. In the 3D image display device, the display data (DATA) may include the left eye image data, the right eye image data, etc.

The frame conversion controller 630 may receive the 3D sink signal 3D_Sync from the stereo controller 620, and transmit the frame conversion control signals PCS and BIC to the image signal processor 610 and the data driver 400.

On the other hand, referring FIG. 1, the shutter member 3 may be shutter glasses 30 as a glasses type, but is not necessarily limited thereto. Therefore, the shutter member may include mechanical shutter glasses (goggles), optical shutter glasses, etc. The shutter glasses 30 may be operated to be tuned to the display panel 100, such that it may allow right eye shutters 32 and 32' and left eye shutters 31 and 31' to alternately block light for a predetermined period. The right eye shutter may be in a closed state 32 or an open state 32' and the left eye shutter may be in an open state 31 or a closed state 31'. For example, while the right eye shutter is opened, the left eye shutter may be in a closed state. While the left eye shutter is in the opened state, the right eye shutter may be in a closed state. In addition, both the left eye shutter and the right eye shutter may be in an opened state or a closed state.

The shutter of the shutter glasses 30 may be formed based on a liquid crystal display device, an organic light emitting device, an electrophoretic display device, etc., and is not necessarily limited thereto. For example, the shutter may include two transparent conductive layers and a liquid crystal layer disposed therebetween. A polarization film may be disposed on the surface of the conductive layer. The liquid crystal material is rotated by voltage applied to the shutter. Therefore, the shutter may be in an opened state or a closed state by the rotation.

For example, left eye images 101 and 102 are output to the display panel 100 and the left eye shutter 31 of the shutter glasses 30 is in an opened state OPEN where light is transmitted and the right eye shutter 32 is in a closed state CLOSE where light is blocked. In addition, right eye images 101' and 102' are output to the display panel 100 and the right eye shutter 32' of the shutter glasses 30 is in an opened state OPEN where light is transmitted and the left eye shutter 31' is in a closed state CLOSE where light is blocked. As a result, only the left eye recognizes the left eye image for a predetermined time. Next, only the right eye recognizes the right eye image for a predetermined time. Consequently, the 3D images allowing depth perception are recognized by the difference between the left eye image and the right eye image.

The image recognized by the left eye is an image that is displayed at an N-th frame F(N), for example, an image where a quadrangle 101 and a triangle 102 are spaced by a distance α. Meanwhile, the image recognized by the right eye is an image that is displayed at an N+1 frame F(N+1), for example, an image where a quadrangle 101' and a triangle 102' are spaced by a distance β. As described above, when a distance between the images recognized by both eyes is different, the quadrangle and the triangle are seen with different distance perception such that the quadrangle is spaced from behind the triangle, thereby allowing the depth perception. The depth perception in which both objects are spaced from each other can be controlled by controlling the distance α and β by which the triangle and the quadrangle are spaced from each other.

Referring to FIG. 1, an arrow direction shown in the display panel 100 represents a sequence of applying the gate-on voltage to the plurality of gate lines. For example, the gate-on signals are applied from the upper gate line of the display panel 100 and thus the gate-on signals can be sequentially applied to the lower gate line.

For example, the display panel 100 can display the left eye images 101 and 102 as follows. The gate-on voltage is sequentially applied to the gate line, such that the data voltage is applied to the pixel electrode through the thin film transistor connected to the corresponding gate line. At this time, the applied data voltage is a data voltage (hereinafter referred to as left eye data voltage) for representing the left eye images 101 and 102, and the applied left eye data voltage may be maintained for a predetermined time by the storage capacitor. In the same manner, the data voltage (hereinafter referred to as right eye data voltage) for representing the right eye images 101' and 102' is applied and may be maintained for a predetermined time by the storage capacitor.

Referring to FIG. 2, the left eye image data L1 and L2 and the right eye image data R1 are alternately input to the display panel 100. At this time, the image data may be a signal that is displayed in a digital format to output images or pictures to the display panel 100. Before all the left eye image data are input and all the right eye image data are input or before all the right eye image data are input and all the left eye data are input, the time when the image data are not input is called a vertical blank VB. Any one of the left eye shutters 31 and 31' and the right eye shutters 32 and 32' of the shutter glasses 30 is changed into a closed state CLOSE for at least a predetermined time in VB and the other one thereof is maintained in an opened state OPEN. In the drawings, the slashed portions of the left eye shutter and the right eye shutter mean a closed state CLOSE. Also, both the left eye suttees 31 and 31' and the right eye shutters 32 and 32' may be in a closed state at a period where the left eye image data or the right eye image data are input.

The left eye shutters 31 and 31' and the right eye shutters 32 and 32' are in a closed state at a period where the left eye image data or the right eye image data are input. Before the input of the left eye image data or the right eye image data, white image data may be input. For example, referring to FIG. 1, before the input of the right eye images 101' and 102', the white image data is first input. For example, after the white image data is input, the right eye images 101' and 102' are written from the top to the bottom of the display panel 100. The blank period may exist between the input period of the white image data and the input period of the left eye image data or the right eye image data. When the white image data is input, the left eye shutter 31, 31' and the right eye shutter 32, 32' of the shutter glass 30 are both in the closed state such that the white image is not recognized. When the left eye image or the right eye image are input after the white image data is input, the response speed of the display device is based on the rising time of the liquid crystal such that the response speed may be fast. Accordingly, the time that the left eye shutters 31, 31' or the right eye shutters 32, 32' are opened may be increased such that the display device may be bright. In addition, the response speed may be quick such that the time that the data voltage can be charged at the lower portion of the display device may be sufficiently ensured before the shutter is opened, as a result, a dragging phenomenon of the image and the contrast deterioration may be reduced and cross-talk between the left eye image and the right eye image may be reduced. Here, the black image data may be input instead of the white image data according to the operation of the display panel 100 (referring to FIG. 8). Also, in the case that the gray values of two continuous images are similar to each other, the white image or the black image is input between two continuous images such that the deterioration of the response speed that may be generated due to the small difference of the data voltage may be prevented, and as a result, a dragging phenomenon of the image and the contrast deterioration may be reduced and the cross-talk between the left eye image and the right eye image may be reduced.

It is assumed that the display panel 100 is a liquid crystal display, and that the image data making the liquid crystal molecules be a lying helix state is input before the left eye image data or the right eye image data is input. For example, when the display panel is a TN-type liquid crystal panel of a normally white mode and a VA-type liquid crystal panel of a normally black mode, the white image data may be input, and when it is a TN-type liquid crystal panel of a normally black mode and a VA-type liquid crystal panel of the a white mode, the black image data may be input. In the state that the liquid crystal molecules are mainly laid (the lying helix state), for the record of the left eye image or the right eye image, the liquid crystal molecules are raised at an appropriate angle. In general, the raising time of the liquid crystal molecule is shorter than the falling time thereof such that the recording of the left eye image or the right eye image in the state that the liquid crystal molecules lie is faster than the recording of the image in the state that the liquid crystal molecules stand (the standing helix state) or are inclined at the appropriate angle. If the image is further quickly recorded, the time that the left eye shutter 31, 31' or the right eye shutter 32, 32' is opened may be increased such that the display device may be further bright.

If a predetermined time t1 is passed from the time that the input of the left eye image data or the right eye image data is completed, the left eye shutter 31, 31' or the right eye shutter 32, 32' may be changed from the closed state to the opened state. The predetermined time t1 may be defined based on the response time of the liquid crystal of the display panel 100. For example, due to the response time of the liquid crystal, until the right eye images 101' and 102' are output after the input of the right eye image data R1 is completed, the predetermined time is needed. Therefore, after t1 time elapses, the right images 101' and 102' can be recognized by opening the right eye shutters 32 and 32' and the crosstalk phenomenon due to the previous image can be prevented. In detail, the raising time of the TN type liquid crystal is 1.1 ms, the falling time is 2.8 ms, VB is 2.7 ms, and t1 may be less than 1.0 ms. Here, as the response time of the liquid crystal is decreased, the time t1 may be decreased. For example, when the image data to lie most of the liquid crystal molecules is input before the input of the left eye image data or the right eye image data, the image is quickly recorded such that the time t1 may be reduced.

Referring to FIG. 10 in which one example of the signal waveform of the 3D display device is shown, the gate-on signals are sequentially applied from the first gate line to the final gate line such that the right eye images (R) may be sequentially applied to the plurality of pixels connected to the corresponding gate lines or the left eye images (L) may be sequentially applied to the plurality of pixels connected to the corresponding gate lines. Herein, while the right images (R) are sequentially applied to the plurality of pixels connected to the corresponding gate lines, the right eye shutter may be in an opened state and the left eye shutter may be in a closed state. Further, while the left eye images (L) are sequentially applied to the plurality of pixels connected to the corresponding gate lines, the left eye shutter may be in an opened state and the right eye shutter may be in a closed state.

The images having a predetermined gray value may be input between the input period of the right eye image (R) and the input period of the left eye image (L), which may be referred to as gray insertion. For example, after the right eye image (R) is displayed on the display device, black images, white images, etc., may be displayed on the entire screen and then the left eye image (L) may be displayed thereon. At this time, the predetermined gray value is not limited to black or white and therefore may have various values. When the image having a predetermined gray value is inserted into the entire screen of the display device, crosstalk between the right eye image and the left eye image can be prevented and the luminance of the three dimensional image display device may be increased.

The white image or the black image may be input to one whole screen or may be partially input to the screen. For example, referring to FIG. 11, the gate-on voltage is applied to the plurality of gate lines that are arranged horizontally from top to bottom, and the white image may be input to the lower portion $g_h$ of the screen. Alternatively, the black image may be input to the lower portion $g_h$ of the screen. For example, when the display panel is the TN-type liquid crystal panel of the normally white mode and the VA-type liquid crystal panel of the normally black mode, the white image data may be input, and when it is the TN-type liquid crystal panel of the normally black mode and the VA-type liquid crystal panel of the normally white mode, the black image data may be input. After the input of the left eye image 101 and 102 of the frame F(N) is completed, the white image is input to the lower portion $g_h$ of the screen during the same horizontal period time, and then the right eye image 101' and 102' of the frame F(N+1) may be input.

When the white image or the black image is input to a portion of one screen, the control of the response speed of the left eye image or the right eye image of the next frame may be easy, and the generation of the distortion of the display quality may be reduced under the compensation of the image. For example, in the case that the white image or the black image is input to the lower portion $g_h$ of the screen, differently from the upper portion of the screen, the time that the lower portion $g_h$ of the screen is completely charged with the white or the black exists before the left eye image or the right eye image of the next frame is input such that the response speed is controlled or the image compensation is executed based on the white image or the black image, and thereby the distortion of the display quality may be reduced.

Here, the lower portion $g_h$ of the screen may be an experimental value determined under the gate delay. For example, in the case that the display panel 100 is a liquid crystal panel, the lower portion $g_h$ of the screen may be calculated based on the vertical resolution, the response speed of the liquid crystal, the charging time, etc. For example, the lower portion $g_h$ of the screen may be calculated by the following Equation 1.

$$g_h=(\text{vertical resolution})\times(\text{response speed of the liquid crystal})/(\text{charging time}) \quad [\text{Equation 1}]$$

Here, the response speed of the liquid crystal may be the falling time of the liquid crystal, and the charging time may be a value determined based on the driving frequency and the vertical resolution of the liquid crystal panel. In detail, in the case that the liquid crystal panel has a size of 1920×1080, the vertical resolution is 1080. In the case that the falling time of the liquid crystal is 2.82 msec, the charging time is 5.63 msec, and the lower portion $g_h$ of the screen is 540, the white image may be input in the lower direction from about the ½ way position of the screen.

Referring to FIG. 3 and FIG. 4, in the method of inputting the image data to make the liquid crystal molecule lie, the gate-on voltage Von is applied to the plurality of gate lines of the display panel 100 and the plurality of data lines are applied with the common voltage Vcom. For example, all gate lines may be applied with the gate-on voltage Von during the first horizontal period 1H, and all data lines may be applied with the common voltage Vcom by the gate-on voltage, and in this case, the white image or the black image may be output. Also, the gate-on voltage Von may be applied to the gate lines that are only disposed at the lower portion $g_h$ of the screen.

Next, the gate-off voltage Voff may be applied during the second horizontal period 2H, the first gate line G1 may be applied with the gate-on voltage Von during the third horizontal period 3H, the second gate line G2 may be applied with the gate-on voltage Von during the horizontal period 4H, and the third gate line G3 may be applied with the gate-on voltage Von during the fifth horizontal period 5H. In this case, the left eye image data or the right eye image data may be input from the third horizontal period 3H, and the left eye image or the right eye image may be output from top to bottom of the display panel.

Referring to FIG. 3, the display device includes a display panel assembly 300, a gate driver 500 and a data driver 400 connected thereto, a gray voltage generator 800 connected to the data driver 400, and a signal controller 600 controlling them. The gate driver 500 may be mounted on the display panel assembly 300, and may be realized as an independent IC chip. When the gate driver 500 is mounted on the display panel assembly 300, a plurality of gate wires may be connected by a data metal layer, a gate metal layer, or a capacitance diode. When the gate driver 500 is formed with the independent IC chip, the gate-on voltage may be simultaneously applied from the gate IC chip to the plurality of gate wires.

The display panel assembly 300 may include the plurality of pixels, the plurality of gate lines G1-Gn, and the plurality of data lines D1-Dm. One pixel may include the switching element Trsw, the liquid crystal capacitor Clc, and the storage capacitor Cst may be omitted.

The signal controller 600 receives input image signals R, G, and B and input control signals for controlling the display of the input signals from an external graphics controller (not shown). Examples of the input control signals include a vertical synchronizing signal Vsync, a horizontal synchronizing signal Hsync, a main clock signal MCLK, and a data enable signal DE.

The signal controller 600 appropriately processes the input image signals R, G, and B on the basis of the input control signals according to the operation conditions of the liquid crystal panel assembly 300, and generates a gate control signal CONT1 and a data control signal CONT2. Then, the signal controller 600 transmits the gate control signal CONT1 to the gate driver 500, and transmits the data control signal CONT2 and the processed image signal DAT to the data driver 400.

The gate control signal CONT1 includes a scanning start signal STV for instructing to start scanning, and at least one clock signal for controlling an output cycle of the gate-on voltage Von. The gate control signal CONT1 may further include an output enable signal OE for defining the duration of the gate-on voltage Von.

The data control signal CONT2 includes a horizontal synchronization start signal for informing the start of transmission of the image signals to one row of pixels PX, a load signal for instructing to apply data signals to the data lines D1 to Dm, and a data clock signal. The data control signal CONT2 may further include an inversion signal for inverting the voltage polarity of the data signal with respect to the common voltage Vcom (hereinafter "the voltage polarity of the data signal with respect to the common voltage" is simply referred to as "the polarity of the data signal").

The data driver 400 receives the digital image signals DAT for a row of pixels PX according to the data control signal CONT2 from the signal controller 600, and selects the gray voltages corresponding to the digital image signals DAT. Then, the data driver 400 converts the digital image signals DAT into the analog data signals, and applies the converted analog data signals to the data lines D1 to Dm. Here, the gray voltage is generated by the gray voltage generator 800.

The gate driver 400 applies the gate-on voltage Von to the gate lines G1 to Gn according to the gate control signal CONT1 from the signal controller 600 and turns on the switching elements Trsw that are respectively connected to the gate lines G1 to Gn. Then, the data signals applied to the data lines D1 to Dm are applied to the pixels PX through the turned-on switching elements Trsw.

A difference between the voltage of the data signal applied to the pixel and the common voltage Vcom becomes a charging voltage of the liquid crystal capacitors (e.g. Clc), for example, the pixel voltage. The arrangement of liquid crystal molecules varies according to the magnitude of the pixel voltage, such that the polarization of light passing through the liquid crystal layer of the display panel assembly 300 changes. The change of the polarization causes a change in transmittance of light by the polarizer that is attached to the liquid crystal panel assembly 300.

This process is repeated for every one horizontal period (which is also called "1H" and is equal to one cycle of the horizontal synchronizing signal Hsync and the data enable signal DE). Then, the gate-on voltage Von is sequentially applied to all the gate lines G1 to G2n and the data signals are applied to all the pixels PX, such that the images for one frame are displayed.

When the next frame starts after one frame is completed, the state of the inversion signal RVS applied to the data driver 400 is controlled such that the polarity of the data signal applied to each pixel PX is inverted with respect to the polarity of the previous frame ("frame inversion"). At this time, in one frame, the polarity of the data signal that flows through a data line may be inverted and the polarities of the data signals that are applied to a row of pixels are the same according to the characteristics of the inversion signal RVS ("row inversion").

Referring to FIG. 5 to FIG. 7, in the gate driver 500 mounted to the display panel assembly 300, the method of inputting the image data to make the liquid crystal molecules mainly lie may be realized. In addition, the gate IC chip that is not mounted to the display panel assembly may realize the method of inputting the image data to make the liquid crystal molecules mainly lie.

The first switching element TR1 is connected to the first scan start signal line STVP1 and the gate lines G1 to Gn+1. The first scan start signal line STVP1 is connected to the control electrode and the input electrode of the first switching element TR1, the control electrode and the input electrode of the first switching element TR1 are connected to each other, and the output electrode of the first switching element TR1 is connected to the gate lines G1 to Gn+1. If the first scan start signal line STVP1 is applied with the gate-on voltage Von during the first horizontal period 1H, the gate lines G1 to Gn+1 are applied with the gate-on voltage Von through the first switching element TR1.

In the period that the three dimensional image enable signal is applied, the first scan start signal line STVP1 may be applied with the gate-on voltage Von. Here, the three dimensional image enable signal may be applied in the period that the left eye image data or the right eye image data is input.

When considering the charging ratio of the liquid crystal capacitor Clc, the first horizontal period 1H may be appropriately extended. For example, the first horizontal period 1H may be longer than the second horizontal period to the fifth horizontal period 2H to 5H.

The second switching element TR2 is connected to the voltage signal line Vss, the second scan start signal line STVP2, and the gate lines G1-Gn+1. The input electrode of the second switching element TR2 is connected to the voltage signal line Vss, the control electrode is connected to the second scan start signal line STVP2, and the output electrode is connected to the gate lines G1 to Gn+1. If the second scan start signal line STVP2 is applied with the on pulse during the second horizontal period 2H, the second switching element TR2 is turned-on. Through the second switching element TR2, the gate-off voltage Voff applied to the voltage signal line Vss is applied to the gate lines G1 to Gn+1, and thereby the gate lines G1 to Gn+1 may be reset.

In addition, the first switching element TR1 and the second switching element TR2 may be connected to the portion of the plurality of gate lines G1 to Gn+1, and the other gate lines may not be connected. In this case, if the first scan start signal line STVP1 is applied with the gate-on voltage Von during the first horizontal period 1H, the gate-on voltage Von may only be applied to the gate line connected to the first switching element TR1. Also, if the second scan start signal line STVP2 is applied with the on pulse during the second horizontal period 2H, the gate-off voltage Voff may only be applied to the gate line connected to the second switching element TR1.

Referring to FIGS. 5 and 6, the gate driver 500 includes a plurality of stages SR1 to SRn+1 that are dependently connected. Each of the stages SR1 to SRn+1 includes two input terminals IN1 and IN2, two clock input terminals CK1 and CK2, a voltage input terminal Vin receiving the low voltage Vss corresponding to the gate-off voltage, a reset terminal RE, an output terminal OUT, and a transmitting signal output terminal CRout.

The first input terminal IN1 is connected to the transmitting signal output terminal CRout of the previous stage, thereby receiving the transmitting signal CR of the previous stage, and the first stage does not have the previous stage such that the first stage receives the scan start signal through the first input terminal IN1.

The second input terminal IN2 is connected to the output terminal OUT of the next stage, thereby receiving the gate voltage of the next stage. Here, the (n+1)th stage SRn+1 (a dummy stage) that is finally formed does not have the next stage such that the scan start signal is applied through the second input terminal IN2.

The first clock signal CKV is applied to the first clock terminal CK1a of the odd-numbered stages of the plurality of stages, and the second clock signal CKVB having the inverted phase is applied to the second clock terminal CK2. On the other hand, the second clock signal CKVB is applied to the first clock terminal CK1 of the even-numbered stage and the first clock signal CKV is applied to the second clock terminal CK2, and the phase of the clock signal input to the same terminal becomes reversed compared with the odd-numbered stage.

The gate-off voltage is applied to the voltage input terminal Vin, and the reset terminal RE is connected to the transmitting signal output terminal CRout of the dummy stage SRn+1 that is most finally disposed.

Here, the dummy stage SRn+1 is the stage generating and outputting the dummy gate voltage, differently from the different stages SR1 to SRn. For example, while the gate voltage output from the different stages SR1 to SRn is transmitted through the gate line, the data voltage is applied to the pixel to display the image, however the dummy stage SRn+1 may not be connected to the gate line, and even if it is connected to the gate line, the dummy stage SRn+1 is connected to the gate line of the dummy pixel (not shown) that does not display the image such that it is not used for displaying the image.

Referring to FIGS. 5 and 6, each stage SR of the gate driver 500 according to an exemplary embodiment of the present invention includes an input section 510, a pull-up driver 511, a transmitting signal generator 512, an output unit 513, and a pull-down driver 514.

The input section 510 includes one transistor (the fourth transistor Tr4), the input terminal and the control terminal of the fourth transistor Tr4 are commonly connected (diode-connected) to the first input terminal IN1, and the output terminal is connected to the node Q (hereinafter referred to as the first node). The input section 510 executes the function of transmitting the high voltage to the node Q in the case that the high voltage is applied to the first input terminal IN1.

The pull-up driver 511 includes two transistors (the seventh transistor Tr7 and the twelfth transistor Tr12) and two capacitors (the second capacitor C2 and the third capacitor C3). Firstly, the control electrode and the input electrode of the twelfth transistor Tr12 are commonly connected such that the clock signals CKV and CKVB are input through the first clock terminal CK1, and the output electrode is connected to the pull-down driver 514. Also, the input electrode of the seventh transistor Tr7 receives the clock signals CKV and CKVB through the first clock terminal CK1, and the control terminal and the output terminal are connected to the pull-down driver 514. Here, the second capacitor C2 is connected between the input electrode and the control electrode of the seventh transistor Tr7, and the third capacitor C3 is connected between the control electrode and the output electrode of the seventh transistor Tr7.

The transmitting signal generator 512 includes one transistor (the fifteenth transistor Tr15) and one capacitor (the fourth capacitor C4). The input electrode of the fifteenth transistor Tr15 is input with the clock signals CKV and CKVB through the first clock terminal CK1, and the control electrode is connected to the output of the input section 510, for example, the node Q. The control electrode and the output electrode of the fifteenth transistor Tr15 are connected through the fourth capacitor C4. The transmitting signal generator 512 outputs the transmitting signal CR according to the voltage of the node Q and the clock signals CKV and CKVB.

The output unit 513 includes one transistor (the first transistor Tr1) and one capacitor (the first capacitor C1). The control electrode of the first transistor Tr1 is connected to the node Q, and the input electrode receives the clock signals CKV and CKVB through the first clock terminal CK1. The control electrode and the output electrode of the first transistor Tr1 are connected through the first capacitor C1, and the output terminal is connected to the gate lines G1 to Gn. The output unit 513 outputs the gate voltage according to the voltage of the node Q and the clock signals CKV and CKVB.

The pull-down driver 514 may execute the function of decreasing the potential of the node Q and the voltage output to the gate line to remove the charges remaining on the stage SR such that the gate-off voltage is smoothly output. The pull-down drivers 514 includes nine transistors (the second transistor Tr2, the third transistor Tr3, the fifth transistor Tr5, the sixth transistor Tr6, the eighth transistor Tr8 to the eleventh transistor Tr11, and the thirteenth transistor Tr13).

Firstly, the fifth transistor Tr5, the tenth transistor Tr10, and the eleventh transistor Tr11 are coupled in series between the first input terminal IN1 receiving the transmitting signal CR of the previous stage SR and the voltage input terminal Vin applied with the low voltage corresponding to the gate-off voltage. The control terminal of the fifth and eleventh transistors Tr5 and Tr11 receives the clock signals CKV and CKVB through the second clock terminal CK2, and the control terminal of the tenth transistor Tr10 receives the clock signals CKV and CKVB through the first clock terminal CK1. Here, the clock signals CKV and CKVB input to the first clock terminal CK1 and the second clock terminal CK2 have different phases. Also, the node Q is connected between the eleventh transistor Tr11 and the tenth transistor Tr10, and the output terminal of the first transistor Tr1 of the output unit 513 is connected between the tenth transistor Tr10 and the fifth transistor Tr5, that is, connected to the gate lines G1 to Gn.

A pair of transistors Tr6 and Tr9 are coupled in parallel between the node Q and the low voltage. The control terminal of the sixth transistor Tr6 receives the transmitting signal CR of the dummy stage through the reset terminal RE, and the control terminal of the ninth transistor Tr9 is input with the gate voltage of the next stage through the second input terminal IN2.

A pair of transistors Tr8 and Tr13 are respectively connected between the outputs of two transistors Tr7 and Tr12 of the pull-up driver 511 and the low potential level. The control terminals of the eighth and thirteenth transistors Tr8 and Tr13 are commonly connected to the output terminal of the first transistor Tr1 of the output unit 513, that is, the gate lines G1-Gn.

Finally, a pair of transistors Tr2 and Tr3 are coupled in parallel between the output of the output unit 513 and the low potential level Vss. The control terminal of the third transistor Tr3 is connected to the output terminal of the seventh transistor Tr7 of the pull-up driver 511, and the control terminal of the second transistor Tr2 is input with the gate voltage of the next stage through the second input terminal IN2.

If the gate voltage of the next stage is input through the second input terminal IN2, the pull-down driver 514 has the function of changing the voltage of the node Q into the low voltage through the ninth transistor Tr9 and changing the voltage output to the gate line into the low voltage through the second transistor Tr2. Also, if the transmitting signal CR of the dummy stage is applied through the reset terminal RE, it changes the voltage of the node Q into the low voltage through the sixth transistor Tr6 one more time. On the other hand, if the second clock terminal CK2 applied with the voltage having the phase different from the voltage applied to the first clock terminal CK1 is applied with the high voltage, the voltage output to the gate lines G1 to Gn is changed into the low voltage through the fifth transistor Tr5.

The transistors Tr1-Tr13 and Tr15 formed in the stage SR may be NMOS transistors.

The gate voltage output in the stage SR is transmitted through the gate lines G1 to Gn. The gate lines G1 to Gn may be represented to have a resistor Rp and a capacitor Cp in a view of the circuit. Those values are values that one gate line (G1 to Gn) has wholly, and may vary according to the configuration and characteristics of the display panel assembly 300.

While exemplary embodiments of the present invention have been described herein with reference to the figures, it is to be understood that the invention is not limited to the disclosed exemplary embodiments, but, on the contrary, is intended to cover various modifications and equivalent arrangements.

What is claimed is:

1. A three dimensional image display device comprising:
a display panel alternately displaying left-eye image data within a left-eye display period and right-eye image data within a right-eye display period, wherein a lower portion of the display panel is applied with a gate-on voltage after an upper portion of the display panel is a applied with the gate-on voltage,
wherein white image data is displayed within a white image display period, and wherein the white image display period is disposed either before the left-eye display period and after the right-eye display period or before the right-eye display period and after the left-eye display period,
wherein the white image data is displayed exclusively on the lower portion of the display panel, during the white image display period,
wherein the white image date is displayed on all pixels in the lower portion of the display panel at the same time, and
wherein a response speed of a left eye image or a right eye image of a next frame is increased by the display of the white image data.

2. The three dimensional image display device of claim 1, wherein the three dimensional image display device further comprises a shutter member having a left eye shutter and a right eye shutter, and the left-eye display period coincides with a period in which the right eye shutter is closed, the right-eye display period coincides with a period in which the left eye shutter is closed, and the white image display period coincides with a period in which both the left eye shutter and the right eye shutter are closed.

3. The three dimensional image display device of claim 2, wherein the left eye shutter is opened after a first predetermined time has passed from the completion of the display of the left eye image data, and the right eye shutter is opened after the first predetermined time has passed from the completion of the display of the right eye image data.

4. The three dimensional image display device of claim 3, wherein the display panel further comprises a liquid crystal material, and the first predetermined time is determined based on a response time of the liquid crystal material.

5. The three dimensional image display device of claim 3, wherein one of the left eye shutter and the right eye shutter is opened and the other of the left eye shutter and the right eye shutter is closed between the left-eye display period and the right-eye display period.

6. The three dimensional image display device of claim 1, wherein the display panel further comprises a plurality of gate lines and a plurality of data lines, wherein at least one gate line of the plurality of gate lines receives a gate-on voltage during a first horizontal period, and each of the plurality of data lines receive a voltage corresponding to the white image data.

7. The three dimensional image display device of claim 6, wherein at least one gate line of the plurality of gate lines receives a gate-off voltage during a second horizontal period.

8. The three dimensional image display device of claim 7, wherein at least one gate line of the plurality of gate lines receives the gate-on voltage during a third horizontal period, and each of the plurality of data lines receive a voltage corresponding to the left eye image data or the right eye image data.

9. The three dimensional image display device of claim 1, wherein the display panel further comprises a gate line and a gate driver, and the gate driver is integrated on a substrate.

10. The three dimensional image display device of claim 9, wherein the gate driver comprises a first scan start signal line and a first switching element connected to the first scan start signal line.

11. The three dimensional image display device of claim 10, wherein an input electrode and a control electrode of the first switching element are connected to the first scan start signal line, and an output electrode of the first switching element is connected to the gate line.

12. The three dimensional image display device of claim 10, wherein the display panel further comprises a plurality of gate lines and a plurality of data lines, wherein at least one gate line of the plurality of gate lines receives a gate-on voltage from the first scan start signal line for a first horizontal period, and each of the plurality of data lines receives a voltage corresponding to the white image data.

13. The three dimensional image display device of claim 10, wherein the gate driver further comprises a voltage signal line, a second scan start signal line, and a second switching element connected to a voltage signal line and a second scan start signal line.

14. The three dimensional image display device of claim 13, wherein an input electrode of the second switching element is connected to the voltage signal line, a control electrode of the second switching element is connected to the second scan start signal line, and an output electrode of the second switching element is connected to the gate line.

15. The three dimensional image display device of claim 13, wherein the display panel further comprises a plurality of gate lines and a plurality of data lines, and at least one gate line of the plurality of gate lines receives a gate-off voltage from the voltage signal line during a second horizontal period.

16. The three dimensional image display device of claim 9, wherein the gate driver comprises a voltage signal line, a second scan start signal line, and a second switching element connected to the voltage signal line and the second scan start signal line.

17. The three dimensional image display device of claim 16, wherein the display panel further comprises a plurality of gate lines and a plurality of data lines, and at least one gate line of the plurality of gate lines receives a gate-off voltage from a voltage signal line during a second horizontal period.

18. The three dimensional image display device of claim 9, wherein the gate driver comprises a plurality of stages connected to one end of the gate line, wherein each stage comprises a first input terminal, a second input terminal, an output terminal, and a transmitting signal output terminal, and wherein the first input terminal of at least one of the plurality of stages is connected to the transmitting signal output terminal of another of the plurality of stages, and the output terminal is connected to the second input terminal of the another stage.

19. The three dimensional image display device of claim 18, wherein the at least one stage comprises an input section, a pull-up driver, a pull-down driver, an output unit, and a transmitting signal generator.

20. The three dimensional image display device of claim 19, wherein the input section, the pull-down driver, the output unit, and the transmitting signal generator are connected to a first node.

* * * * *